May 22, 1951     C. I. PLACE     2,554,311
FLEXIBLE COUPLING ASSEMBLY
Filed Nov. 20, 1948

INVENTOR;
CHARLES I. PLACE
BY Robert B. Terry
ATTORNEY.

Patented May 22, 1951

2,554,311

UNITED STATES PATENT OFFICE 2,554,311

FLEXIBLE COUPLING ASSEMBLY

Charles I. Place, Norfolk, Conn.

Application November 20, 1948, Serial No. 61,170

4 Claims. (Cl. 64—6)

This invention relates to improvements in flexible coupling assemblies, and more particularly to assemblies utilized for torque transmission purposes, as between driving and driven shafts or other rotative, operatively connected elements.

This applicant is aware of the considerable number of types of flexible shaft couplings which have found their way into trade channels for a period of years. Some of these have met with moderate success in specialized fields of adaptation and usage, but may be produced only at a high cost, requiring considerable precision machining. Still others require frequent service attention for replacement of the flexible elements of the coupling. However, none of these which have come to the attention of this designer, is well adapted in all respects to the driving of certain powered appliances, for example an electric fan. It is, accordingly, a principal object of the present invention to overcome the several noted shortcomings by a novel design of flexible coupling, particularly but not exclusively adapted for the field of usage last referred to.

An additional and important object of the invention is realized in a flexible coupling assembly which, while permitting a reasonable range of misalignment of driving and driven elements, nevertheless provides under all conditions for a positive torque transmission between the driving and driven elements, irrespective of any moderate degree of misalignment of such elements.

A still further and noteworthy object of the invention is realized in a flexible coupling assembly in which a positive operative interlock of driving and driven elements exists at all times, which operative relation is not disturbed by misalignment conditions.

A still further and important objective is realized in a combination of parts such that, when the coupling is shaft mounted, a hub on the shaft in coaction with a driving pin or lug, constitutes what may be termed a rigid torque connection at all times.

The coupling construction is further objectively such that when employed with a propeller type fan, the fan is permitted to operate in a fan circle, the plane of which may intersect at other than a right angle, the axis of a shaft by which the propeller is rotatively driven.

The foregoing and numerous other objects and advantages of the invention will more fully and clearly appear from the following detailed description of presently preferred embodiment of the invention, particularly when considered in connection with the accompanying drawing, in which.

Figure 1:
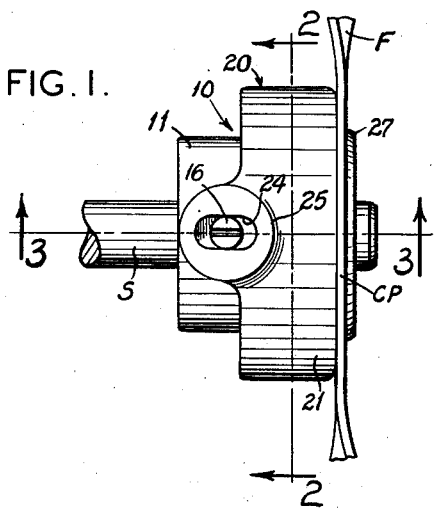
Fig. 1 is a side elevation of a coupling embodying the present improvements, and which serves as an operative connection between a power shaft and a propeller fan, parts of the latter being omitted for clearness.
Figure 2:
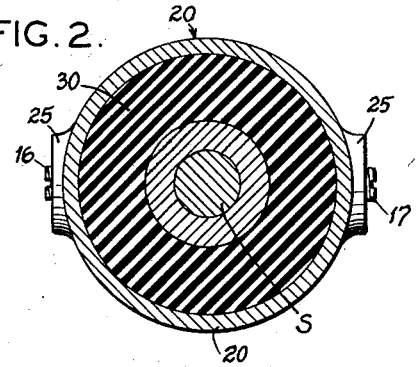
Fig. 2 is a transverse sectional view of the assembly of Fig. 1, particularly as viewed along line 2—2 thereof.

Referring now by characters of reference to the drawing, the assembly is shown as mounted on and carried by a rotatable power shaft S, being located just inwardly of a free end portion of such shaft. Attached to the end of shaft S is a hub 10, this being of a generally cylindrical form, and provided with a central bore for receiving the shaft S. It is a preference that the hub 10 be so formed as to embody a portion 11 of a relatively larger diameter, and an adjoining portion 12 of a relatively reduced diameter, from which formation there results an annular shoulder 13 of substantial area.

The hub, generally indicated at 10, is provided intermediately of its larger diameter portion 11, with a plurality, shown as two transverse radial bores 14 and 15. These bores are by preference threaded and serve to receive in threaded relation, a plurality (shown as two) of combined set screws and radial driving lugs or pins such as 16, threaded in bore 15, and 17 threaded into bore 15. The shaft S is shown as recessed in the regions engaged by the inner ends of screws 16 and 17 as indicated at 18, to enhance the holding power of the elements 16—17, considered as set screws. It will be understood of course that although these elements or one thereof, serve for attachment of the hub 10 to the shaft S, other attachment means may be provided, for example the conventional key and slot arrangement (not shown). It will further appear that it is not strictly necessary that the driving pins be utilized as set screws, and that only one thereof need be threaded into close engagement with the shaft in case the hub is not otherwise mounted.

It will be seen that, in keeping with the stated function of the pin or lug elements 16—17, that each is carried as a radially projecting element beyond the larger diameter portion of the hub, the purpose of which will later more clearly appear.

A second major component of the assembly consists of a casing generally indicated at 20, and including an external cylindrical wall portion 21 together with an end plate or closure portion 22. This latter is provided with a large central aperture 23 into and perhaps through which extends the reduced portion 12 of the hub 10, there being provided a wide clearance between the smaller hub end and the margins of aperture 23.

The axial length of the casing portion 22, which will be seen to be in the nature of a cup structure, is preferably about equal to the axial dimension of the hub 10, so that the latter is at least substantially enclosed by the cup, but with a substantial clearance between these elements throughout, as will appear from the drawing.

Although the device is operative with a single screw or pin such as 16, for reasons of better balance and torque distribution at least a pair or somewhat larger plurality of the pins 16—17 is preferred, only two being shown for simplicity of illustration. A positive driving engagement between the hub and casing or shell of the coupling is provided for by one or a suitable plurality of longitudinal slots 24. Each such slot is formed in the outer cylindrical wall of the cup structure 20, and by preference a boss 25 provides an extended depth of material in and around the region of each of the slots. Each such slot is of a length selected according to the maximum range of axial misalignment to be permitted between driving and driven elements, and the width of each such slot is so arrived at as substantially to correspond to the diameter of the outer portion of the driving lug or pin 16 or 17, and so as to provide not appreciably more than a safe working clearance between the sides of the pin and the slot in which it works.

Figure 3:
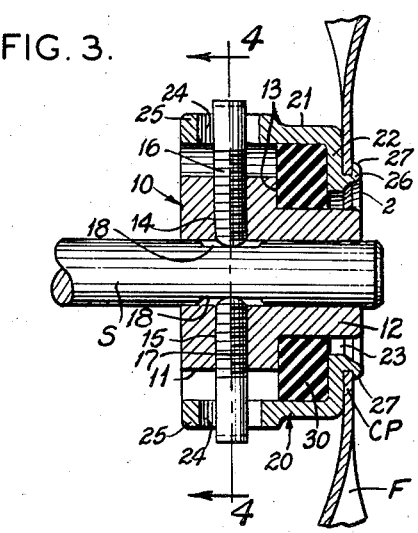
Fig. 3 is a transverse sectional view of the coupling, taken in the plane of the axis of rotation, particularly the axis of the power shaft.
Figure 4:
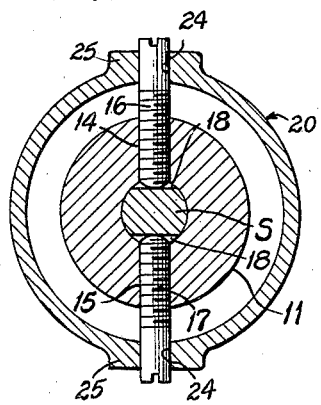
Fig. 4 is a sectional view taken in a plane normal to the drive shaft and particularly along line 4—4 of Fig. 3.

The cup such as 20 is preferably provided with means enabling its attachment to a driven element, in the case of Figs. 1 and 3, this being shown as a propeller type fan F having a usual center plate or spider portion of planar aspect engaging the outer wall of the element 22 of the hub. As a convenient and low cost facility for attachment of the cup of the coupling to the center plate or spider CP, the plate portion 22 is provided with a short tubular extension of thin section and indicated at 26. This is of a diameter snugly to extend through the aperture in the center plate of the fan, and is, for example, peened or spun, as shown at 27, in the region of the margin of the center plate opening.

A third major element consists of an annulus 30, with planar sides and susceptible of deformation without set, one such side being adjacent the shoulder 13, and the opposite face adjacent member 22. In many assemblies the ring 30 is secured or connected to the cup and hub parts merely by a frictional relation between them and the ring, but in other cases the ring is desirably bonded to one or both of parts 12 and the internal surface of the portion 22 of the cup. The center opening of the annulus 30 is preferably of such diameter as snugly to receive and embrace the reduced end 12 of the hub, while the outside diameter of the ring 30 is preferably such that it is rather snugly inserted into the cup fully depthwise of the casing 20. Thus the annulus 30 is virtually completely embraced and almost fully enclosed by the cup when assembled thereto.

The materials selected for the ring 30 may consist of a number of suitable vulcanized rubber compositions, synthetics, plastics of various kinds, and other materials exhibiting rubber-like characteristics. The life, durability, and if desired the resistance to flexure of the annulus 30, may be enhanced by utilizing a cured composition in which layers of fabric (not shown) are embedded prior to cure.

Figure 5:
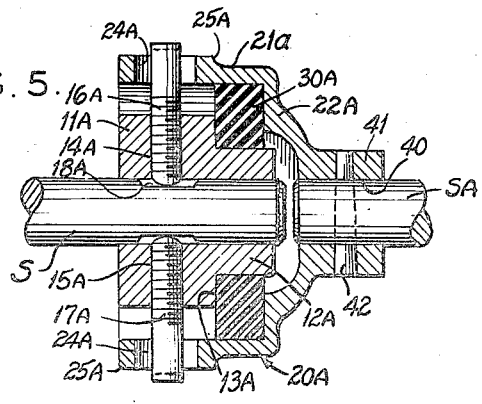
Fig. 5 is a view taken similarly to Fig. 3 but showing a slightly modified form of coupling in which one of the driven elements of the coupling is adapted for connection to a second shaft.

A minor modification is shown by Fig. 5, in which the structure of the essential components of the coupling is virtually the same as in the principal structure, but in which the cup end closure 22A is axially extended somewhat and so formed as to enable connection to a second shaft, which may if desired be either a driving or a driven element. Such a second shaft is indicated at SA, and is secured into a short shaft bore 40 of an axial extension 41 of the closure portion 22A. A wedge pin such as 42 or other suitable shaft securement means, may be employed as desired. It may here be noted that, otherwise than as described in this paragraph, the several parts and functions thereof, may be identical to the corresponding parts shown by Fig. 3. For this reason the parts of the modification of Fig. 5, except as stated, are each differentiated by suffix letter A.

Although the function of the several elements of the assembly in actual usage is thought to have been apparent from the foregoing description of the parts and their relation, it may nevertheless be noted for completeness of understanding that the introduction of an assembly such as the present, as a connection between operative elements of a rotative system, presupposes a possible axial misalignment of the driving and driven rotative parts, such as shaft S and fan F or shaft SA. It will now have appeared that the annulus 30 of 30A of rubber, leather or the like, permits an oscillatory misalignment of the hub and casing each revolution of the parts. It will further have appeared as a particular advantage of the present assembly that in spite of the resulting periodic relative rocking movement of the parts, there is nevertheless preserved at all times and in every part of the circle of rotation, a positive transmission of torque through the coupling, by reason of lateral impingement of the driving pins such has 16, 17, upon the sides of the slots 24, along which these driving lugs are free to operate with sliding engagement. Thus in the case of a connection between two shafts such as S and SA, the driving pins or lugs bear against the sides of the slots, or vice versa according to direction of drive and in the direction of rotation only. Inasmuch as it is preferred that the width of the slots only exceeds the diameter of the pins by a working clearance, the described arrangement avoids any objectionable backlash or other appreciable disturbance in driving relation between the parts as might otherwise occur incident to torque reversals and fluctuations.

The material of the annular or toroidal element such as 30, may consist of any suitable flexible substance capable of supporting the fan or other driven element while at rest, in a position in which the driven element is approximately concentric with the drive shaft. Nevertheless the element 30 must be of such flexibility as to permit the fan or other driven element to be moved in any of several planes displaced from a plane normal to the axis of rotation, the action being generally similar to that of a universal joint.

From the foregoing description it will now appear that the fan F is free to move about the driving lugs or pins and to assume a plane of rotation relative to the drive shaft, which may be at least slightly different from a usual normal plane, but which may be selected by the fan itself when in operation, in accordance with the set of the fan blades and the pitch thereof, as determined by the fan spider arms or equivalent portions of blades and center disc.

The design of flexible coupling assembly as exemplified by the current disclosure, is objectively such that the fan is supported on a cushion of flexible material and is permitted to "float" in a plane of rotation such as will be self-assumed by the fan in accordance with its pitch, balance and other characteristics. This is possible by reason of the fact that the driven element such as a fan is not constrained by the usual rigid attachment to a drive shaft. Further by reason of the cushion support of the fan on the shaft, the fan exhibits a considerably lessened tendency to set up and to transmit vibrations to the shaft itself, and will definitely result in a reduction of the noise component due to vibrations, and serve as well to minimize wear on motor bearings. Thus, although the coupling is by no means exclusively adapted to use with or on a propeller fan, it is of particular advantage in this combination.

It will now have appeared that the device in the exemplary form described, will serve fully to realize all of the several objects hereinabove set forth, as well as others implied from the description. Although described in detail, the specific nature of the description should be understood solely in an instructive rather than in any limiting sense, many variants being possible in the embodiment of the improvements without departure from the intended scope of the claims.

I claim as my invention:

1. In a flexible coupling assembly for use on a rotatable shaft, a hub carried by the shaft, a cup surrounding the hub in spaced relation, a connection from the cup adapted for operative attachment to an additional rotatable element, a plurality of radial pins on the hub, a slot for each pin, formed in the wall of the cup, the slots each being of a width conforming substantially to the diameter of a pin which extends into the slot, but having working clearance with the sides of the pin, at least one pin being threaded on its innermost end, and the hub having a tapped aperture for the pin such that the threaded pin serves as a set screw for the hub, and a flexible annulus bonded to the hub, and bonded internally of the cup, and axially spaced from said pins.

2. In a flexible coupling assembly for use in connecting a driving shaft and a driven member, a shaft hub in the form of a sleeve, and of a generally cylindrical form, a cup structure including a cylindrical shell an and apertured plate at one end of the shell, the shell of the cup being of appreciably larger diameter than the hub, and being provided with a plurality of longitudinal slots, a plurality of driving pins threaded transversely into said hub and at least one of said pins constituting a set screw for securement of the hub to a shaft, the driving pins each extending into one of said longitudinal slots in the shell portion of the cup in torque transmitting relation thereto, and a flexible and deformable annulus carried externally of the hub and mounted internally of the cup.

3. In a flexible coupling assembly for use on a rotatable shaft and for the connection of such shaft to a driven member, an elongate hub of a generally cylindrical form having a portion of relatively larger diameter and an adjoining portion of reduced diameter resulting in a shoulder between said portions, a shell or casing in the form of a cup, including a substantially cylindrical body, and a closure plate portion apertured centrally to receive the smaller diameter portion of the hub, and having an appreciable clearance between the smaller diameter hub portion and the margin of the aperture of the cup, an annulus of a deformable flexible material of substantial thickness, and having opposite planar sides with a central aperture conforming substantially to that of the reduced portion of the hub, said annulus being fitted over said reduced hub portion and bonded to the shoulder on the hub, and bonded at its opposite face to the internal wall of the plate or closure portion of the cup, the hub having a plurality of transverse tapped radial bores, equiangularly spaced about the axis of the hub, a plurality of radial driving pins each threaded into one of the last said bores and projected substantially therebeyond, and at least one of said driving pins constituting a set screw for securement of the hub to a shaft, the cylindrical portion of the cup being provided with a plurality of longitudinal slots corresponding in number to the radial driving pins, and each slot being entered by one of said pins, the slots being of a width such as to provide a working clearance with the adjacent driving pin whereby to provide a positive torque-transmitting connection between the several said pins and the slotted portions of the cup, and the apertured end closure of the cup being formed to permit connection thereof to a driven element.

4. In a flexible coupling assembly for connection of a rotatable shaft to a driven member, an elongate hub having adjacent portions of larger and smaller diameters resulting in a hub of stepped section, a casing in the form of a cup including a peripheral body portion all parts of which are substantially spaced outwardly of the hub, and a closure plate portion of the casing, centrally apertured to receive the smaller portion of the hub, and having a substantial clearance between the said smaller hub portion and the margin of the aperture of the cup, an annulus of a deformable flexible material fitted snugly over the reduced portion of the hub and bonded thereto, the hub having a plurality of transverse radial bores equally spaced about the hub axis, a radial driving pin secured into each of the last said bores and projected substantially therebeyond, at least one of said driving pins constituting a set screw for securement of the hub to a shaft, and being threaded into one of the transverse radial hub bores, the peripheral body portion of the casing being provided with a plurality of longitudinal slots corresponding in number and spacing to the radial driving pins, each such slot being entered by one of the pins and each slot being of a width to provide substantially a working clearance with the adjacent driving pin whereby to provide a positive torque-transmitting connection between the pins and slotted portions of the cup, and serving substantially to relieve the flexible annulus of torque shear, the apertured end closure of the cup being formed to permit connection thereof to a driven member.

CHARLES I. PLACE.

REFERENCES CITED

The following references are of record in the file of this patent:

UNITED STATES PATENTS

| Number | Name | Date |
|---|---|---|
| 1,786,810 | Yoder | Dec. 30, 1930 |
| 1,872,962 | Jones | Aug. 23, 1932 |